Sept. 3, 1946. V. GUILLEMIN, JR 2,406,764
AUTOMATIC GRAPH DRAWING RECORDER
Filed June 20, 1942 2 Sheets-Sheet 1
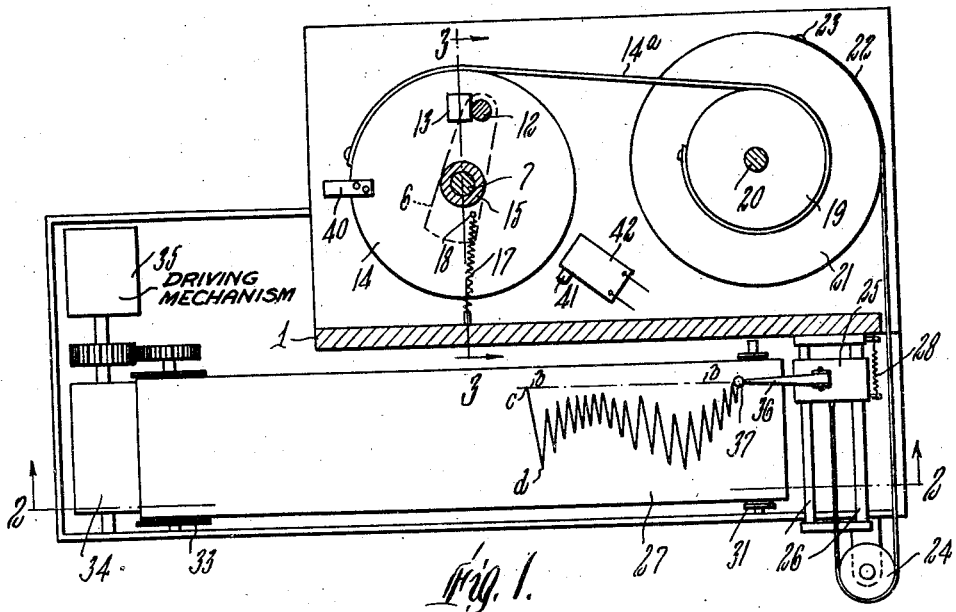
Fig. 1.
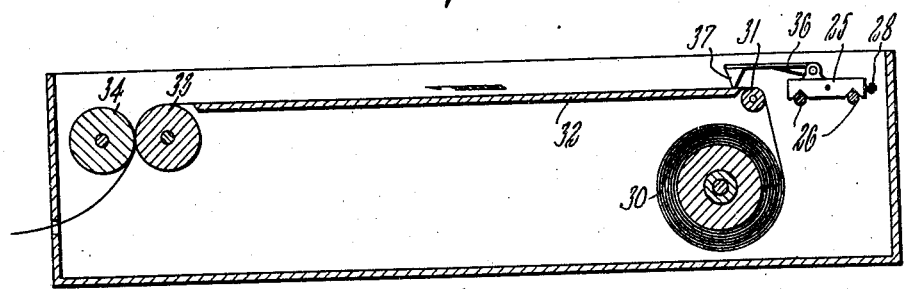
Fig. 2.
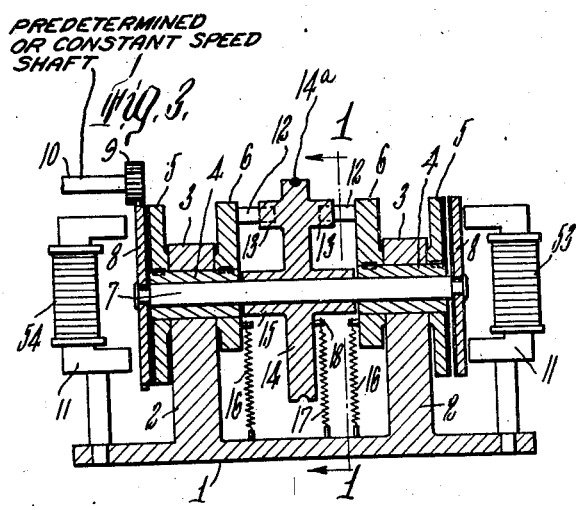
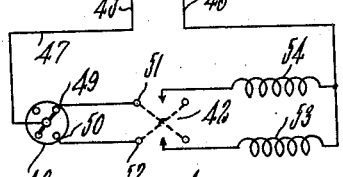
Fig. 4.
Inventor
Victor Guillemin Jr.
Attys.

Sept. 3, 1946.  V. GUILLEMIN, JR  2,406,764
AUTOMATIC GRAPH DRAWING RECORDER
Filed June 20, 1942  2 Sheets-Sheet 2

Inventor
Victor Guillemin, Jr.
by Wright, Brown, Quinby & May
Attys.

Patented Sept. 3, 1946

2,406,764

UNITED STATES PATENT OFFICE 2,406,764

AUTOMATIC GRAPH DRAWING RECORDER

Victor Guillemin, Jr., Dayton, Ohio

Application June 20, 1942, Serial No. 447,840

9 Claims. (Cl. 234—71)

This invention relates to mechanism for automatically recording in the form of a graph the time sequence of any series of events. These events may be the successive arrival of manufactured articles or parts at a given point on an assembly or production line, the passage of people by a gate, the heart beats of a man, or any other of a great variety of events which it may be found desirable to record.

An object of this invention is to provide such a mechanism in which the rate of occurrence is accurately delineated by the graph.

A further object is to provide, if desired, a convenient scale where the rate to be graphed is subject to substantial variations, which would otherwise result in undue crowding of the graph where the events follow closely one upon another, with a corresponding undue extension where the time intervals happen to be greater.

For a complete understanding of this invention, reference may be had to the accompanying drawings in which Figure 1 is a somewhat diagrammatic view partly in top plan and partly in section on section line 1—1 of Figure 3 of a recorder embodying a portion of the invention.

Figures 2 and 3 are sectional views on lines 2—2 and 3—3, respectively, of Figure 1.

Figure 4 is a wiring diagram of the pen-actuating mechanism.

Figure 10:
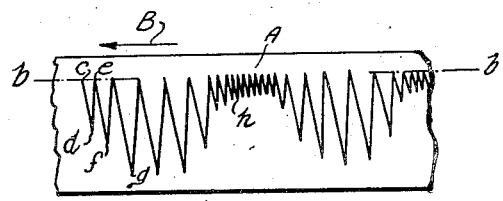
Figure 10 is a fragmentary plan view of a record made without the refinements which produce records such as are shown in Figures 5 and 9.

The general principle of operation of the apparatus may be understood from consideration of Figure 10 of the drawings, which, however, shows certain defects which are avoided by the practice of this invention. Referring to this figure, a broad band of paper A, which is the member on which the record is made and which may be taken from a roll, is moved slowly in the direction of the arrow B, while a pen point normally at the level b—b starts moving rapidly downward, thus drawing a steeply sloping line c—d on the paper.

At the end of the recorded interval the pen snaps back rapidly, tracing the steeply sloping line d—e, and immediately starts on a second downward travel along the line e—f, f representing the point it reaches at the end of the next interval, whereupon it again snaps back and then moves downwardly again from the level b—b. This rapid return and fresh start downward of the pen is repeated at the beginning of each interval.

When the rate is low, the intervals are long and the pen reaches the low point such as g, but when the rate is high, its travel ends higher up as at h. Thus the ends of the lines at d, f, g, and h form points on a graph which rises and falls with the rate. The low points of the lines, however, do not represent the true rates as the pen does not travel downwardly for the full intervals between successive events, some of this time being used for the return travel and this time varies for different lengths of travel.

Where the variations of rates may be expected to be large, there is a second fault of a graph such as shown in Figure 10 due to the peculiar reciprocal relation between interval and rate. To illustrate, let the range of rates to be recorded be approximately from 10 to 100 per minute. The time difference between the duration of intervals at rates 10 and 11 is: $1/10 - 1/11 = 1/110$, while the difference at rates 100 and 101 is:

$$1/100 - 1/101 = 1/10{,}100$$

The former is roughly 100 times greater than the latter. If, therefore, the pen travels at a uniform rate, the difference in its length of travel between rates 10 and 11 will be about 100 times as great as between 100 and 101. This results in a scale of rate on the graph which is very widely spaced at the low rate and badly crowded at the high rate.

The first fault of a graph such as shown in Figure 10 involving the return time of the pen is effectually eliminated in accordance with this invention by having two independent but identical mechanical members which move the pen downwardly alternately. At the beginning of each new interval that member which has been pushing the pen downwardly during the previous interval returns to its upper position and stays there until the end of the new interval, and the other member, simultaneously with the start of return of the first member, starts downwardly. The pen starts upwardly with the first member, but before it reaches the top it is caught by the second member and is moved downwardly therewith. Each of the two pen-carrying members has a whole interval in which to return to its normal position and get ready for carrying the pen in its turn. The return time of the pen itself causes no delay in the time of travel, since the bottom pen position depends on the motion of the downwardly moving carrying member at each actuation and this starts at the same instant at which the pen started on its return motion.

Figure 5:
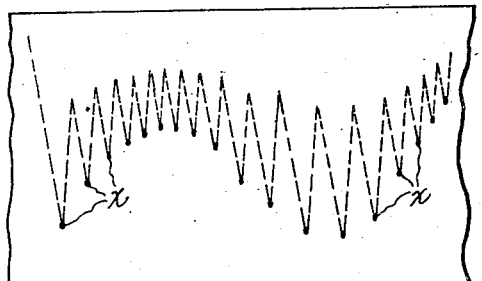
Figure 5 is a plan view of a portion of the record sheet.
Figure 8:
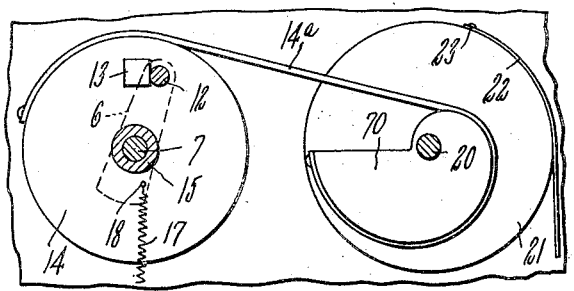
Figure 8 is a fragmentary view similar to a portion of Figure 1, but showing a mechanism particularly adapted for use where substantial differences of time rate are to be recorded.
Figure 9:
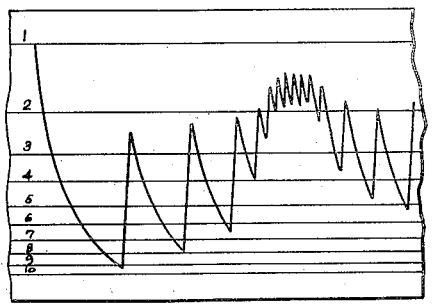
Figure 9 is a top plan view showing the type of record made with the mechanism of Figure 8.

Mechanism which employs the two pen-carrying members is illustrated in Figures 1 to 3, the resulting record being shown in Figure 5, and a modification which takes care of the situation where large variations in rate are to be anticipated and the corresponding graph are shown in Figures 8 and 9, respectively.

Referring to Figures 1, 2 and 3, and first to Figure 3, a base 1 carries two supports 2 having bearings 3 in which sleeves 4 may revolve. Each of these sleeves has a flat disk 5 attached to its outer end and a lever 6 to its inner end. Within the sleeves 4 a shaft 7 is journaled and at each end this shaft has attached thereto a soft iron disk 8. One of these disks has gear teeth in its rim or a gear attached thereto, with which meshes a pinion 9 driven at a constant speed, as by a constant speed motor (not shown), through shaft 10. The assembly of shaft 7 and disks 8 thus turns at a constant rate of speed. Beside rotating, it may also move axially a short distance, the face of the pinion 9 being of sufficient width to allow for this motion while maintaining driving engagement therewith. At 11 are shown electromagnets positioned outwardly of the disks 8 so that when either one is energized, the assembly comprising the shaft 7 and the disks 8 is moved theretoward, bringing the disk 8 at the opposite end into frictional engagement with the adjacent disk 5, thus causing the corresponding sleeve 4 to be rotated with the shaft 7, the sleeves being thus selectively coupled to be rotated by rotation of the shaft 7 depending on which one of the electromagnets 11 is energized at the time. Preferably the adjacent faces of the disks 5 and 8 on each side are faced with leather, or other suitable friction material, so that desired frictional engagement of these parts for turning a pulley 14, through means later described, may be produced, these parts 5 and 8 acting as friction clutches. The electromagnets 11 are placed sufficiently far from the disks 8, however, so that the disks 8 are free to rotate therepast.

Each of the levers 6 carries a stud 12 which may contact with a corresponding boss 13 on the pulley 14 which is carried by a hub 15 freely rotatable on the shaft 7 between the levers 6. These levers are normally held with their studs 12 upward as by springs 16 secured to the opposite ends of the levers 6 and to fixed points of the base 1. A spring 17, extending from a fixed point on the base 1 to a pin 18 secured to the pulley 14, yieldingly holds the pulley 14 in such angular position that the bosses 13 are directly in front of and just in contact with the studs 12.

Assuming that the shaft 10 is turning at a constant speed and current be passed through the coil of the left hand electromagnet 11, the assembly comprising the shaft 7 and the disks 8 is drawn to the left, closing the right hand clutch, and the right hand assembly comprising the disk 5, sleeve 4, and the lever 6 begins to rotate, the stud 12 contacting the corresponding boss 13 and causing the pulley 14 to be rotated from its starting or retracted position. This it continues to do until the current is switched from the left hand to the right hand electromagnet 11, thereupon the right hand assembly comprising the corresponding disk 5, its sleeve 4, and lever 6, is returned to its normal position by its spring 16, and at practically the same instant the left hand assembly comprising the left hand disk 5, sleeve 4, and lever 6 begins to rotate. In the meantime the pulley 14 has started back to its normal position by the action of the spring 17, until its left hand boss 13 is caught by the left hand stud 12 and carried forward again. Thus the pulley 14 is rotated forwardly alternately by the two studs 12, but the time taken for its return does not effect its position at the instant when the current is switched between the left and right hand electromagnets 11, since this position depends solely on the position of the forwardly moving stud 12 which does not have to return before starting out when the current is switched but was already in its normal position ready to start immediately.

The pulley 14 has a cord 14a attached to some convenient point on its rim so that it will wind up on a groove in this rim or unwind as the pulley is turned. At the same time this cord 14a unwinds from or winds on a pulley 19 on the shaft 20. A pulley 21 fixed to the pulley 19 so as to turn therewith has a cord 22 attached thereto as at 23 and this cord extends around a pulley 24 and back to a pen-carrying slide 25 mounted on ways 26 so as to move transversely of a record receiving strip 27. This slide 25 is normally yieldingly held at one limit of its motion, as by means of a spring 28, to which it is returned when displaced therefrom as soon as permitted by the return of the pulley 14 to its inoperative position under the action of the spring 17.

The paper strip 27 from the roll 30 passes over a bar 31, the table 32, and between two rollers 33 and 34, one or both of which are driven mechanically so as to draw the paper 27 slowly across the plate or table 32. The rolls 33 and 34 are shown in Figure 1 as geared together and driven by a suitable constant speed motor indicated diagrammatically at 35. The slide 25 carries the pen arm 36 on which the pen 37 of any suitable type is mounted. The upper limit of the pen corresponds to the position b—b of Figure 10.

*Electrical switching mechanism*

Where ample power is available in the events whose rate is to be recorded, the device for switching the current from one to the other of the two electromagnets 11 may be a simple mechanical double throw switch. In addition to this an over-travel safety switch will be required which will automatically switch the current from one magnet to the other independent of any outside source, as soon as the pen drive mechanism has drawn the pen to the end of its normal travel. This may be accomplished by attaching a stop 40 see (Figure 1) to the pulley 14 which engages and depresses a plunger 41 of the push button double throw double pole ratchet switch at 42. This switch is of the type which is thrown from one to the other of its two positions alternately at each depression of the plunger. It is connected into the circuit as shown in Figure 4.

From the current line 45, a lead 47 leads to the double throw switch 48, which is actuated by the events to be recorded. Its two poles 49 and 50 are connected to the two terminals 51 and 52 of the switch 42. In the position shown of the two switches 43 and 42, the coil 53 of the right hand electromagnet 11 is energized so that the left hand lever 9 is in position to turn the pulley 14 as the shaft 7 is rotated, but if the pulley 14 rotates sufficiently far for the switch 42 to be actuated, the actuation of this switch 42 reverses connection and cuts out the coil 53 and cuts in the coil 54 of the left hand electromagnet 11. Should an event to be recorded take place before the switch 42 is actuated, it actuates the switch 43 to cut out the coil 53 and interpose the coil 54, thus reversing the pen motion short of its downward limit and producing a low point of the graph indicating the occurrence of the even to be graphed such as at $d$ in Figure 1.

It will be noted that the upper limits of motion of the pen are not all positioned at the level $b$—$b$ as shown in Figure 10, and that the distance to which the pen moves away from the line $b$—$b$ is a correct representation of the time between the occurrences to be graphed. Thus the inaccuracy pointed out in connection with Figure 10 does not occur.

As before noted, where variation of rates may be expected to be large, the graph as shown in Figure 1 is widely spaced at the low rate and badly crowded at the high rate. In order to overcome this undesirable condition, the pen may be made to travel at a variable rate, its motion being slowed when the time interval is long over that when the time interval is short. Such an arrangement is shown in Figures 8 and 9. It will be noted that in Figure 1 the cord 14a, which actuates the transverse pen motion, is wound on a cylindrical surface of the pulley 19. In Figure 8 it is shown as wound on a spiral surface of a cam element 70 so that the first portion of the pen motion is rapid and progressively becomes slower. While this variation of rate may be anything desired, a convenient variation is in accordance with the logarithmic ratio, and the scale on the paper on which the graph is made is a logarithmic scale to correspond, as illustrated in Figure 9, where the horizontal scale lines lengthwise of the paper strip are spaced vertically in logarithmic ratio. With the logarithmic scale the difference between 10 and 11 events per minute would be the same as between 100 and 110, each down stroke of the pen then describing a logarithmic curve. This has the advantage that a large range may be included conveniently in a relatively small pen travel and it affords the same relative precision of rating at both ends of the scale. While as shown in this Figure 8 this variation in rate is accomplished by the winding of the cord 14a on the cam element 70, it of course could be accomplished by a similar cam to which the cord 22 might be attached, it being only necessary that the constant angular motion of the pulley 14 be transmitted as a properly variable linear motion of the pen slide 25.

*The recording pen*

Figures 6, 7:
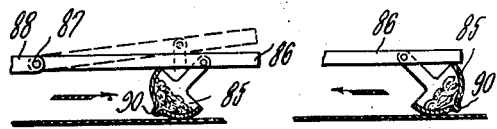
Figures 6 and 7 are views showing a modified marking mechanism showing its position during opposite directions of motion of the marking element support.

In Figures 1 and 9 the graph on the paper is shown as a continuous line, the down points marking the desired graph. In some cases it may be desired for the sake of clarity of the graph to mark only these down points, as these are the only significant parts of the graph, and means may be provided by which the intermediate connecting lines may be eliminated. A method of doing this is illustrated in Figures 6 and 7 in which the pen comprises a rocker member 85 fulcrumed on a pen drive arm 86 pivoted at 87 to a suitable support 88. As the motion of this support 88 is reversed in direction, the rocker 85 is caused to rock over as from the position shown in Figure 6 to that shown in Figure 7 so that a very short protruding pen point 90 of the rocker member 85 makes a dot upon the paper as the rocking takes place. This rocker as shown is a hollow vessel filled with some ink absorbing material such as felt. A short wick communicating with the felt extends through the pen point 90 to the paper. This felt is saturated with a non-drying recording ink.

Figure 5 illustrates such a graph drawn to a uniform scale, except that the dash lines showing the travel of the pen would not appear, only the high and low points being shown by dots, the high point dots, however, having no significance.

From the foregoing description of certain embodiments of this invention, it should be evident to those skilled in the art that various changes and modifications might be made without departing from the spirit or scope of this invention.

I claim:

1. A graph drawing machine, comprising means for supporting and moving a record-receiving member upon which the desired graph is to be drawn, a marking element movable transverse to the direction of motion of said record-receiving member, means tending to hold said element at one end of its path and for returning said element to said end when displaced therefrom, a pair of moving members, means operatively connecting each of said moving members to said element whereby movement of said members moves said element away from said end only, means for driving said members at predetermined speed in element moving direction, means tending to return each of said members to a starting position, and means actuated at each event to be recorded for simultaneously connecting one of said moving means to said driving means and releasing the other of said moving means from said driving means.

2. A graph drawing machine, comprising means for supporting and moving a record-receiving member upon which the desired graph is to be drawn, a marking element movable transverse to the direction of motion of said record-receiving member, means tending to hold said element at one end of its path and for returning said element to said end when displaced therefrom, a pair of moving members, means operatively connecting each of said moving members to said element whereby movement of said members moves said element away from said end only, means for driving said members at predetermined speed in element moving direction, means tending to return each of said members to a starting position, means actuated at each event to be recorded for simultaneously connecting one of said moving means to said driving means and releasing the other of said moving means from said driving means, and means causing the marking element to mark the record at a predetermined time in each such period.

3. A graph drawing machine, comprising means for supporting and moving a record-receiving member upon which the desired graph is to be drawn, a marking element movable transverse to the direction of motion of said record-receiving member, means tending to hold said element at one end of its path and for returning said element to said end when displaced therefrom, a pair of moving members, means operatively connecting each of said moving members to said element whereby movement of said members moves said element away from said end only, means for driving said members at predetermined speed in element moving direction, means tending to return each of said members to a starting position, means actuated at each event to be recorded for simultaneously connecting one of said moving means to said driving means and releasing the other of said moving means from said driving means, and means causing the marking element to mark the record at the end point of each motion of said element away from said end.

4. A graph drawing machine, comprising means for supporting and moving a record-receiving member upon which the desired graph is to be drawn, a marking element mounted for motion transverse to the direction of motion of said record-receiving member, yielding means biasing said element to remain at one end of its path and for returning said element to said end after displacement therefrom, a pair of independent element-moving members, operative connections between said members and element causing movement of either of said members from a starting position to displace said element from said one end, means normally and yieldingly biasing each of said members to starting position permitting said element to be at said end, a constant speed driving means, and means actuated by occurrence of the event to be graphed to couple said driving means to one of said members while simultaneously releasing said driving means from the other of said members so that the coupled member starts to move away from starting position simultaneously with the release of said other member from said driving means and said element returns toward said end only until it becomes actuated by the coupled member.

5. A graph drawing machine comprising means for supporting and moving a record receiving member, a marking element movable transverse to the direction of motion of said record receiving member, yielding means tending to hold said element at one limit of motion and tending to return said element to said limit on displacement therefrom, a rotary shaft, a pair of driven rock members, means for slowly rotating said shaft at a uniform speed, yielding means tending to hold each of said rock members in a retracted angular position, means for selectively coupling one of said rock members to said shaft for rotation by said shaft while releasing the other of said members from said shaft, a third rock member, operative connections from said third rock member to said marking element for moving said marking element away from said one limit of motion on turning of said third rock member away from a normal angular position, and a lug on each of said driven rock members positioned to engage a corresponding lug on said third rock member and to turn said third rock member away from its normal angular position and move said element away from said limit on motion of either of said driven rock members away from its retracted angular position, and means actuated by the events to be graphed for actuating said coupling means to couple said driven rock members alternately to said shaft.

6. A graph drawing machine comprising means for supporting and moving a record receiving member, a marking element movable transverse to the direction of motion of said record receiving member, yielding means tending to hold said element at one limit of motion and tending to return said element to said limit on displacement therefrom, a rotary and axially movable shaft, a disk of magnetic material secured to each end of said shaft, a pair of rock members through which said shaft passes, each member having a disk confronting one of said shaft disks and with one or the other of which the adjacent shaft disk may engage for frictionally driving one of said rock members, which member depending upon the axial position of said shaft, an electromagnet outwardly of each of said shaft disks, the energization of one of which acts to frictionally engage one of said shaft disks with one of said member disks while holding the other shaft disk out of engagement with the other member disk, means for slowly rotating said shaft at a uniform speed, means yieldingly biasing each of the said rock members in one angular position from which it may be turned when in driven relation to said shaft, a third rock member located between the rock members of said pair, cooperating lugs on said third rock member and the rock members of said pair for rocking said third rock member from a predetermined angular position on rocking of either rock member of said pair from its said angular position, a connection from said third rock member to said element for moving said element away from said limit by rocking of said third rock member from said predetermined angular position, and means determined by the events to be graphed for alternately energizing said electromagnets.

7. A graph drawing machine comprising means for supporting and moving a record receiving member, a marking element movable transverse to the direction of motion of said record receiving member, yielding means tending to hold said element at one limit of motion and tending to return said element to said limit on displacement therefrom, a rotary and axially movable shaft, a disk of magnetic material secured to each end of said shaft, a pair of rock members through which said shaft passes, each member having a disk confronting one of said shaft disks and with one or the other of which the adjacent shaft disk may engage for frictionally driving one of said rock members which member depending upon the axial position of said shaft, an electromagnet outwardly of each of said shaft disks, the energization of one of which acts to frictionally engage one of said shaft disks with one of said member disks while holding the other shaft disk out of engagement with the other member disk, means for slowly rotating said shaft at a uniform speed, means yieldingly biasing each of said rock members in one angular position from which it may be turned when in driven relation to said shaft, a third rock member located between the rock members of said pair, cooperating lugs on said third rock member and the rock members of said pair for rocking said third rock member from a predetermined angular position on rocking of either rock member of said pair from its said angular position, a connection from said third rock member to said element for moving said element away from said limit by rocking of said third rock member from said predetermined angular position, means determined by the events to be graphed for alternately energizing said electromagnets, and a limit switch positioned to be actuated by the rocking of said third rock member to a predetermined extent for reversing the energization of said electromagnets.

8. In combination, mechanism including means for supporting and moving a record receiving member, a marking element mounted to move in a path transverse to the motion of said record receiving member, and adapted to mark on said receiving member, a plurality of element moving members, means operatively connecting said members to said element to positively move said element in one direction only, means for moving said element moving members one at a time during successive variable time intervals and at predetermined rates each away from a normal resting position, such motion displacing said movable members from their respective resting positions by amounts depending upon a predetermined relation to time intervals during which such displacement occurs, means for returning said displaced members to their respective resting positions, means for returning said element toward a rest position as far as permitted by said moving members at the ends of such time intervals, said mechanism including means causing said marking element to record on said record receiving member its maximum departures from its rest position in each of said time intervals.

9. A graph drawing machine, comprising means for supporting and moving a record-receiving member upon which the desired graph is to be drawn, a marking element movable transverse to the direction of motion of said record-receiving member, means tending to hold said element at one end of its path and for returning said element to said end when displaced therefrom, a pair of moving members, means operatively connecting each of said moving members to said element whereby movement of said members moves said element away from said end only, means for driving said members at predetermined speed in element moving direction, means tending to return each of said members to a starting position, and means actuated at each event to be recorded for simultaneously connecting one of said moving means to said driving means and releasing the other of said moving means from said driving means, said connecting means including variable motion mechanism causing the rate of motion of said marking element away from said end to progressively decrease at a predetermined rate.

VICTOR GUILLEMIN, JR.